(12) United States Patent
Piper

(10) Patent No.: US 11,360,511 B1
(45) Date of Patent: Jun. 14, 2022

(54) CASE FOR PORTABLE ELECTRONIC COMPUTING DEVICE

(71) Applicant: Pioneer Square Brands, Inc., Seattle, WA (US)

(72) Inventor: Brian Lewis Piper, Seattle, WA (US)

(73) Assignee: PIONEER SQUARE BRANDS, INC., McLean, VA (US)

( * ) Notice: Subject to any disclaimer, the term of this patent is extended or adjusted under 35 U.S.C. 154(b) by 0 days.

(21) Appl. No.: 17/547,114

(22) Filed: Dec. 9, 2021

(51) Int. Cl.
*A45C 11/00* (2006.01)
*G06F 1/16* (2006.01)

(52) U.S. Cl.
CPC .......... *G06F 1/1628* (2013.01); *A45C 11/00* (2013.01); *A45C 2011/003* (2013.01)

(58) Field of Classification Search
CPC ........ A45C 2011/003; A45C 2011/002; A45C 2011/001; H04B 1/3888; H05K 5/02; H05K 5/0243

USPC .......................................................... 206/320
See application file for complete search history.

(56) References Cited

U.S. PATENT DOCUMENTS

| 9,753,494 | B2 * | 9/2017 | Laine ..................... G06F 1/1628 |
| 2013/0221048 | A1 * | 8/2013 | Revels ...................... A45F 3/02 |
| | | | 224/601 |
| 2016/0338459 | A1 * | 11/2016 | Yow ........................ A45C 11/00 |
| 2018/0352925 | A1 * | 12/2018 | Hemesath .............. A45C 11/00 |

* cited by examiner

*Primary Examiner* — King M Chu
(74) *Attorney, Agent, or Firm* — Grandview Law

(57) ABSTRACT

Systems and methods are involved for a portable electronic computing device the system includes (I) a first case section to receive a first device portion, (II) a second case section to receive a second device portion, (III) a spine member being coupled to the first case section, the spine member being coupled to the second case section, and (IV) a flexible elongated member coupled to the spine member.

16 Claims, 9 Drawing Sheets

CASE FOR PORTABLE ELECTRONIC COMPUTING DEVICE

SUMMARY

In one or more aspects a system can include a system for a portable electronic computing device, the portable electronic computing device including a first device portion, and a second device portion, wherein the first device portion being at least one of the following: hingedly couplable with the second device portion and separately uncouplable from the second device portion, the system including (I) a first case section including (A) a base including at least one interior surface, (B) a first side including at least one first wall portion with the at least one first wall portion extending perpendicularly to the at least one interior surface, (C) a second side including at least one second wall portion with the at least one second wall portion extending perpendicularly to the at least one interior surface, and (D) a third side including at least one third wall portion with the at least one third wall portion extending perpendicularly to the at least one interior surface, wherein the at least one first wall portion extends perpendicularly to the second wall portion, and wherein the at least one first wall portion extends parallel with the at least one third wall portion such that the first case section being configured to receive the first device portion of the portable electronic computing device; (II) a second case section including (A) a base including at least one interior surface, (B) a first side including a at least one first wall portion with the at least one first wall portion extending perpendicularly to the at least one interior surface, (C) a second side including a at least one second wall portion with the at least one second wall portion extending perpendicularly to the at least one interior surface, and (D) a third side including a at least one third wall portion with the at least one third wall portion extending perpendicularly to the at least one interior surface, wherein the at least one first wall portion extends perpendicularly to the second wall portion, and wherein the at least one first wall portion extends parallel with the at least one third wall portion such that the second case section being configured to receive the second device portion of the portable electronic computing device; (III) a spine member being coupled to the first case section, the spine member being coupled to the second case section; and (IV) a flexible elongated member coupled to the spine member having a first coupling portion coupled to the spine member at a first spine location, the spine member having a second coupling portion coupled to the spine member at a second spine location, the flexible elongated member including a first length between the first coupling portion of the flexible elongated member and the second coupling portion of the flexible elongated member, the spine member including a first length between the first spine location and the second spine location, the first length of the flexible elongated member being greater than the first length of the spine member. Wherein the spine member includes at least one of the following materials: cloth, bendable metalized synthetic material, acrylonitrile butadiene styrene (ABS), low density polyethylene (LDPE) plastic, polyvinyl chloride, thermoplastic polyurethane (TPU), silicone, fabric, polyester, nylon, leather, neoprene, thermoplastic rubber (TPR), and thermoplastic elastomers (TPE). Wherein the first case portion, the second case portion, and the spine member being of at least one co-molded material structure. Wherein the spine member being coupled to the first case section via being glued to the first case section and the spine member being coupled to the second case section via being glued to the second case section. Wherein the first case section being of at least one first material substance including at least one high-density polyethylene (HDPE) plastic, and wherein the second case section being of the at least one first material substance including the at least one high-density polyethylene (HDPE) plastic. Wherein the spine member being coupled through co-molding to the first case section and the second case section with a reinforced material including an elasticity greater than the first case section and the second case section. Wherein the flexible elongated member includes a mid-portion, the mid-portion positionable to be spaced from the spine member with a gap therebetween. Wherein the flexible elongated member being of a fabric material selected from at least one of polyester, nylon, leather, neoprene, polyurethane and polyvinyl chloride. Wherein the flexible elongated member being of a pliable molded material selected from at least one of silicone, thermoplastic polyurethane (TPU), and thermoplastic rubber (TPR). Wherein the flexible elongated member being coupled to the spine member via stitching, the stitching including at least one of polyester and nylon thread. Wherein the flexible elongated member being coupled to the spine member via at least one of the following: one or more rivets, one or more screws, and one or more pins. Wherein the flexible elongated member being coupled to the spine member via at least an adhesive material. Wherein the flexible elongated member being coupled to the spine member via at least one thermal bonding. Wherein the flexible elongated member being coupled to the spine member via lamination of the flexible elongated member with the spine member. Wherein the flexible elongated member includes a longitudinal dimension and a width dimension, the longitudinal dimension extending between the first coupling portion and the second coupling portion of the flexible elongated member, the width dimension being perpendicular to the longitudinal dimension, the width dimension being constant at positions taken along the longitudinal dimension. Wherein the flexible elongated member includes a mid-portion, a longitudinal dimension, and a width dimension, the longitudinal dimension extending between the first coupling portion and the second coupling portion of the flexible elongated member, the width dimension being perpendicular to the longitudinal dimension, the width dimension at the mid-portion of the flexible elongated member being smaller than the width dimension at other than the mid-portion of the flexible elongated member.

In one or more aspects, a system can include a system for a portable electronic computing device, the portable electronic computing device including a first device portion, and a second device portion, the system including (I) a first case section being configured to receive the first device portion of the portable electronic computing device; (II) a second case section being configured to receive the second device portion of the portable electronic computing device; (III) a spine member being coupled to the first case section, the spine member being coupled to the second case section; and (IV) a flexible elongated handle coupled to the spine member having a first coupling portion coupled to the spine member at a first spine location, the spine member having a second coupling portion coupled to the spine member at a second spine location, the flexible elongated handle including a first length between the first coupling portion of the flexible elongated handle and the second coupling portion of the flexible elongated handle, the spine member including a first length between the first spine location and the second spine location, the first length of the flexible elongated handle being greater than the first length of the spine member. Wherein the flexible elongated handle being selected from at least one of polyester, nylon, leather, neoprene, polyurethane and polyvinyl chloride, silicone, thermoplastic polyurethane (TPU), and thermoplastic rubber (TPR).

In one or more aspects, a system can include a system for a portable electronic computing device, the portable electronic computing device including a first device portion, and a second device portion, the system including (I) a first case section being configured to receive the first device portion of the portable electronic computing device; (II) a second case section being configured to receive the second device portion of the portable electronic computing device; (III) a spine member being coupled to the first case section, the spine member being coupled to the second case section, at least a portion of the spine member extending between the first case section and the second case section; and (IV) a flexible elongated handle being coupled to the spine member. Wherein the spine member includes at least one of the following materials: cloth, bendable metalized synthetic material, acrylonitrile butadiene styrene (ABS), low density polyethylene (LDPE) plastic, polyvinyl chloride, thermoplastic polyurethane (TPU), silicone, fabric, polyester, nylon leather, neoprene, thermoplastic rubber (TPR), and thermoplastic elastomers (TPE).

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of implementations, reference now is made to the following descriptions taken in connection with the accompanying drawings. The use of the same symbols in different drawings typically indicates similar or identical items, unless context dictates otherwise.

With reference now to the figures, shown are one or more examples of a case for portable electronic computing device systems, articles of manufacture, compositions of matter for same that may provide context, for instance, in introducing one or more processes and/or devices described herein.

DETAILED DESCRIPTION

Figure 1:
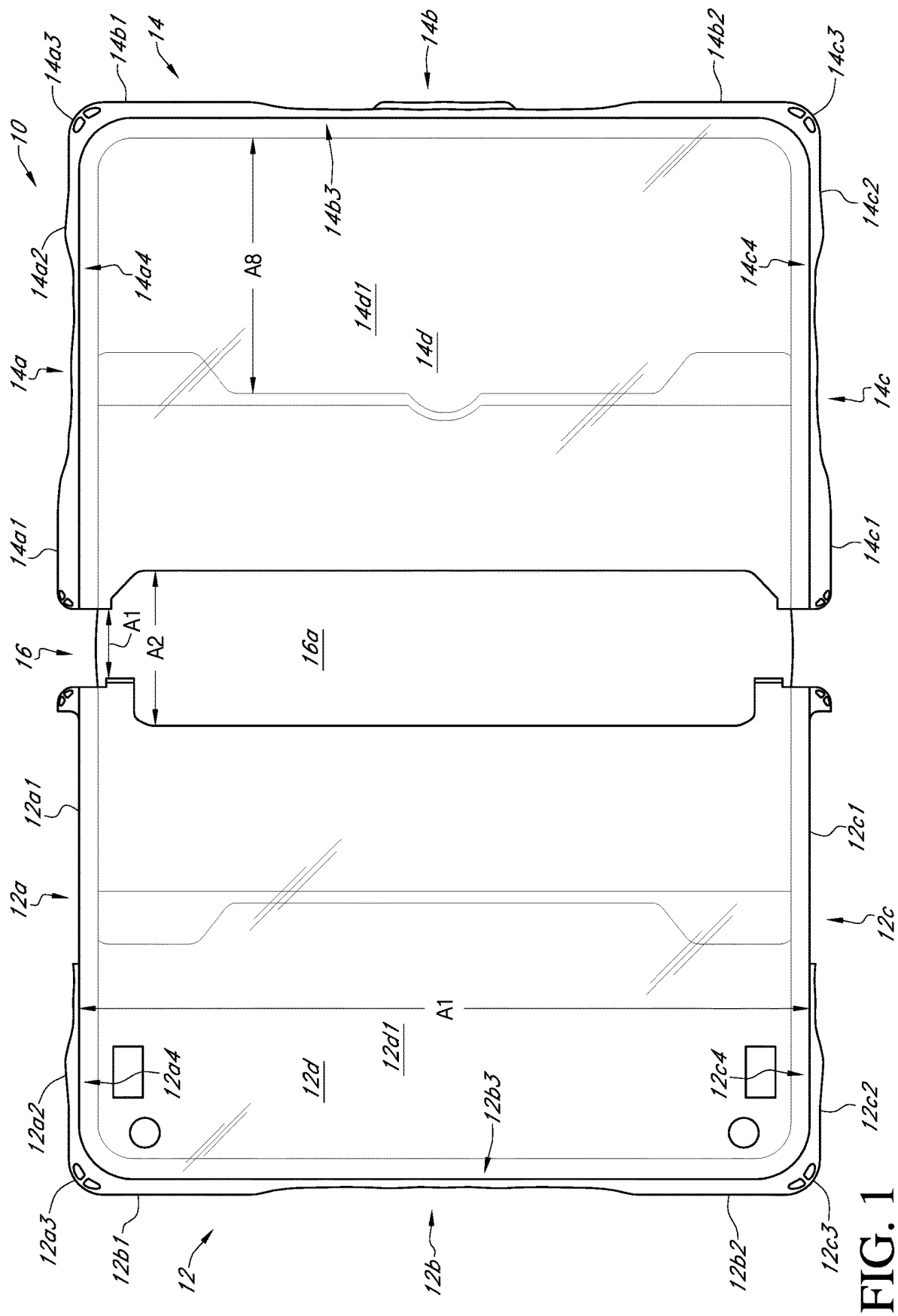
FIG. 1 is an anterior plan view of device case assembly in flat-open configuration including spine member, first case section, and second case section for portable electronic computing device with spine member coupled to first case section and second case member with first handle assembly coupled to spine member.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

Turning to FIG. 1, depicted therein is an anterior plan view of device case assembly in flat-open configuration including spine member, first case section, and second case section for portable electronic computing device with spine member coupled to first case section and second case member with first handle assembly coupled to spine member. In implementations, device case assembly 10 is shown to include first case section 12, second case section 14, and spine member 16.

In implementations, first case section 12 is shown to include side 12a, side 12b side 12b, side 12c, and base 12d. In implementations, side 12a is shown to include device access 12a1, exterior portion 12a2, exterior portion 12a3, and wall 12a4. In implementations, side 12b is shown to include exterior portion 12b1, exterior portion 12b2, and wall 12b3. In implementations, side 12c is shown to include device access 12c1, exterior portion 12c2, exterior portion 12c3, and wall 12c4. In implementations, base 12d is shown to include uncovered base portion 12d1.

In implementations, second case section 14 is shown to include side 14a, side 14b, side 14c, and base 14d. In implementations, side 14a is shown to include exterior portion 14a1, exterior portion 14a2, exterior portion 14a3, and wall 14a4. In implementations, side 14b is shown to include exterior portion 14b1, exterior portion 14b2, and wall 14b3. In implementations, side 14c is shown to include exterior portion 14c1, exterior portion 14c2, exterior portion 14c3, and wall 14c4. In implementations, base 14d is shown to include uncovered base portion 14d1. In implementations, spine member 16 is shown to include spine portion 16a. In implementations, device case assembly 10 is shown to include linear dimension A1, and linear dimension A2. In implementations, the first case section 12 and the second case section 14 can be of at least one first material substance including at least one high-density polyethylene (HDPE) plastic.

Figure 2:
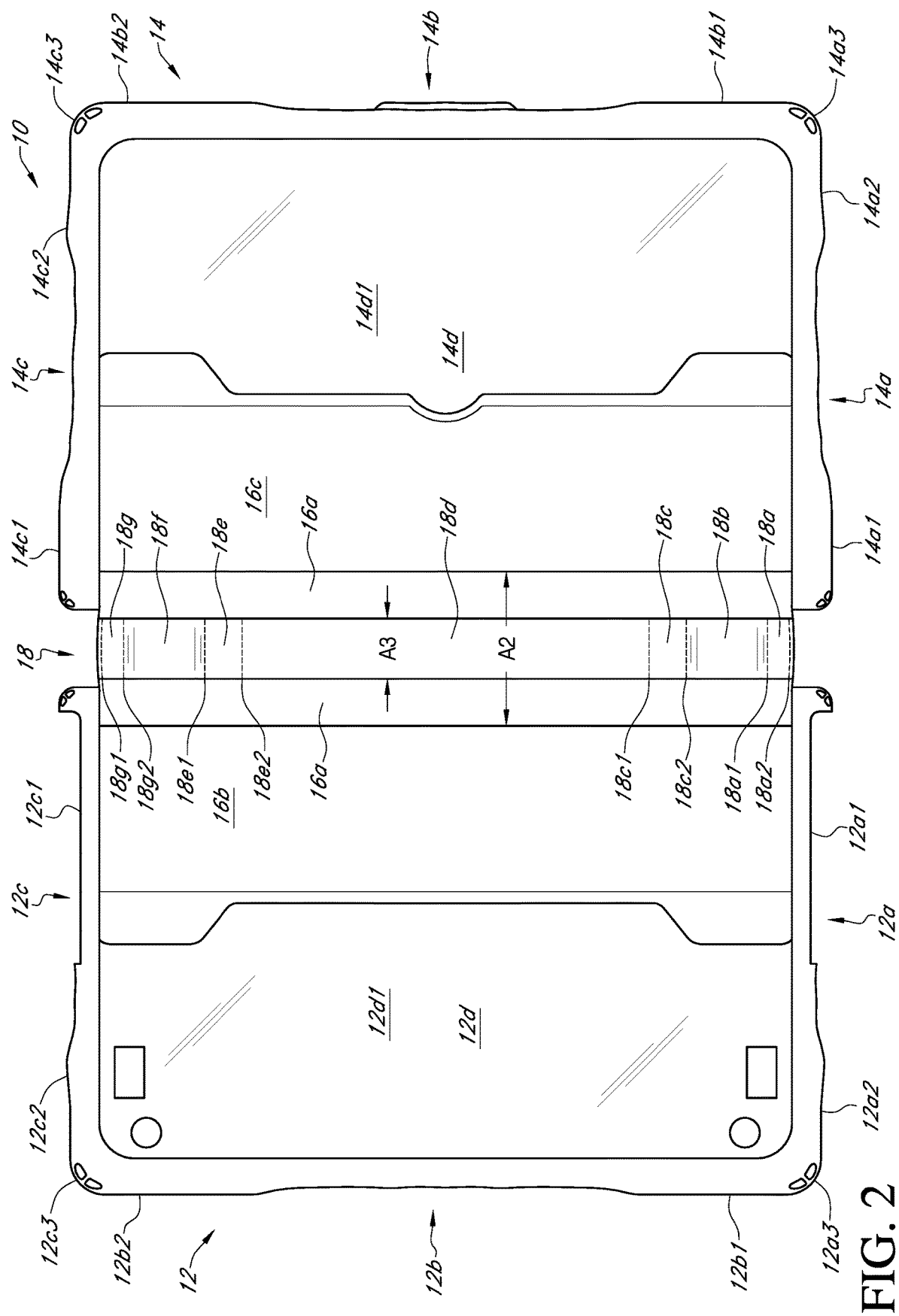
FIG. 2 is a posterior plan view of device case assembly of FIG. 1 in flat-open configuration.

Turning to FIG. 2, depicted therein is a posterior plan view of device case assembly of FIG. 1 in flat-open configuration. In implementations, spine member 16 is shown to include spine portion 16b, and spine portion 16c. In some implementations, spine member 16 can include at least one of the following materials: cloth, bendable metalized synthetic material, acrylonitrile butadiene styrene (ABS), low density polyethylene (LDPE) plastic, polyvinyl chloride, thermoplastic polyurethane (TPU), silicone, fabric, polyester, nylon leather, neoprene, thermoplastic rubber (TPR), and thermoplastic elastomers (TPE). In some implementations, the first case portion 12, the second case portion 14, and the spine member 16 can be of at least one co-molded material structure. In some implementations, spine member 16 can be coupled to the first case section 12 via being glued to the first case section 12 and the spine member 16 can be coupled to the second case section 14 via being glued to the second case section 14. In implementations, the spine member 16 can be coupled through co-molding to the first case section 12 and the second case section 14 with a reinforced material including an elasticity greater than the first case section 12 and the second case section 14.

In implementations, device case assembly 10 is shown to include handle assembly 18. The handle assembly 18 is shown to include contact portion 18a, loop 18b, contact portion 18c, handle 18d (e.g., flexible elongated member), contact portion 18e, loop 18f, and contact portion 18g. The contact portion 18a is shown to be coupled to spine portion 16a of spine member 16 by stitching 18a1 and stitching 18a2. The contact portion 18c is shown to be coupled to spine portion 16a of spine member 16 by stitching 18c1 and stitching 18c2. The contact portion 18e is shown to be coupled to spine portion 16a of spine member 16 by stitching 18e1 and stitching 18e2. The contact portion 18g is shown to be coupled to spine portion 16a of spine member 16 by stitching 18g1 and stitching 18g2.

In implementations, stitching 18a1, stitching 18a2, stitching 18c1, stitching 18c2, stitching 18e1, stitching 18e2, stitching 18g1, and stitching 18g2 can include polyester or nylon thread. In implementations, stitching 18a1, stitching 18a2, stitching 18c1, stitching 18c2, stitching 18e1, stitching 18e2, stitching 18g1, and stitching 18g2 can be replaced by mechanical means such as rivets, screws, or pins. In implementations, stitching 18a1, stitching 18a2, stitching 18c1, stitching 18c2, stitching 18e1, stitching 18e2, stitching 18g1, and stitching 18g2 can be replaced by adhesive material. In implementations, stitching 18a1, stitching 18a2, stitching 18c1, stitching 18c2, stitching 18e1, stitching 18e2, stitching 18g1, and stitching 18g2 can be replaced by thermal bonding. In implementations, stitching 18a1, stitching 18a2, stitching 18c1, stitching 18c2, stitching 18e1, stitching 18e2, stitching 18g1, and stitching 18g2 can be replaced by lamination of handle 18d with spine member 16.

In implementations, handle 18d (e.g., flexible elongated member) of device case assembly 10 is shown to include linear dimension A3 (e.g. width) whereas in implementations, being of constant dimension along linear dimension A1. In implementations, handle 18d can be of a fabric material selected from at least one of polyester, nylon, leather, neoprene, polyurethane and polyvinyl chloride. In implementations, can be of a pliable molded material selected from at least one of silicone, thermoplastic polyurethane (TPU), and thermoplastic rubber (TPR).

Figure 3:
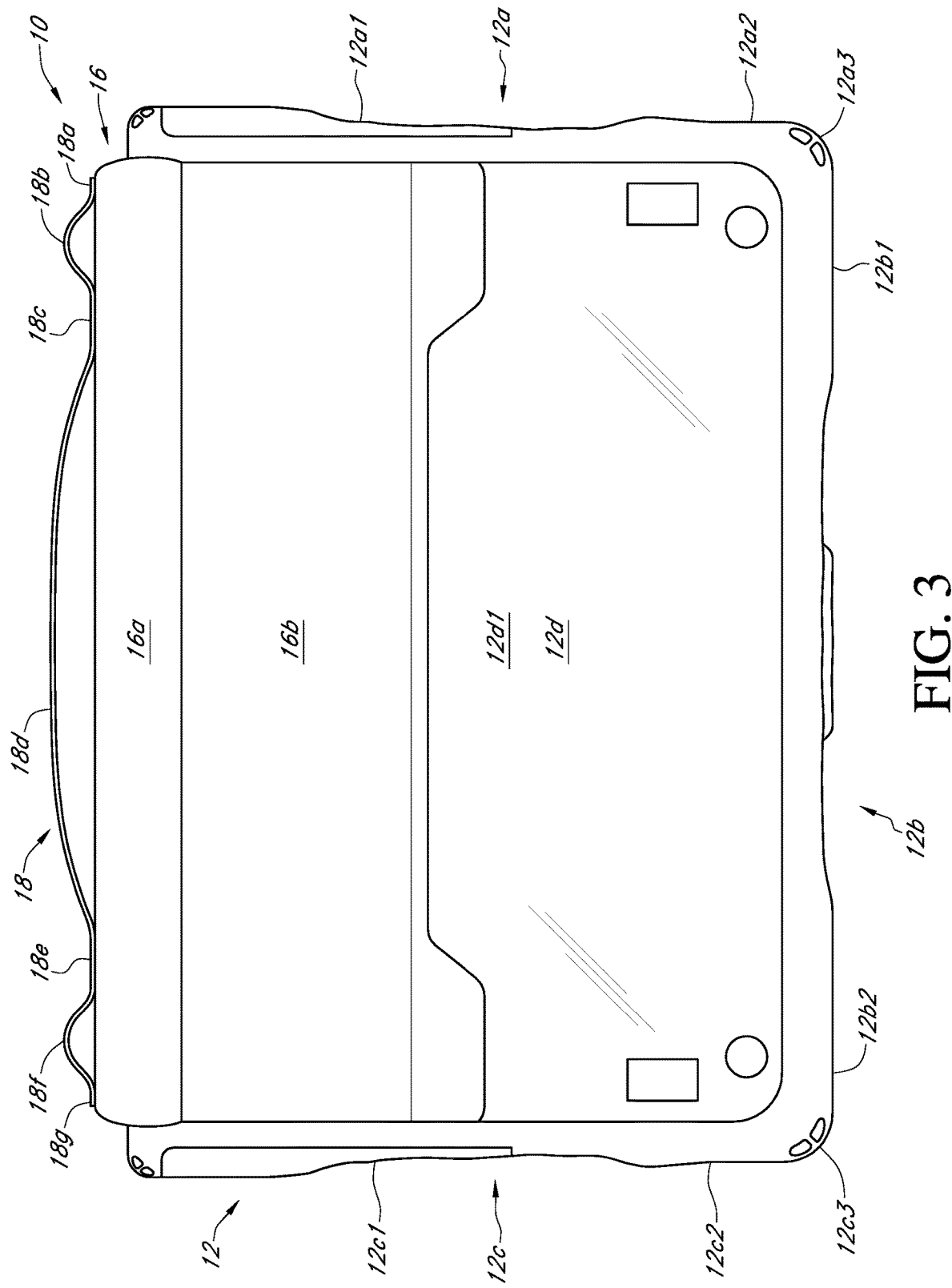
FIG. 3 is a rear side-elevational view of device case assembly of FIG. 1 in closed configuration.

Turning to FIG. 3, depicted therein is a rear side-elevational view of device case assembly of FIG. 1 in closed configuration. In implementations, handle 18d (e.g., flexible elongated member) is shown to include a mid-portion, the mid-portion positionable to be spaced from the spine member 16 with a gap therebetween.

Figure 4:
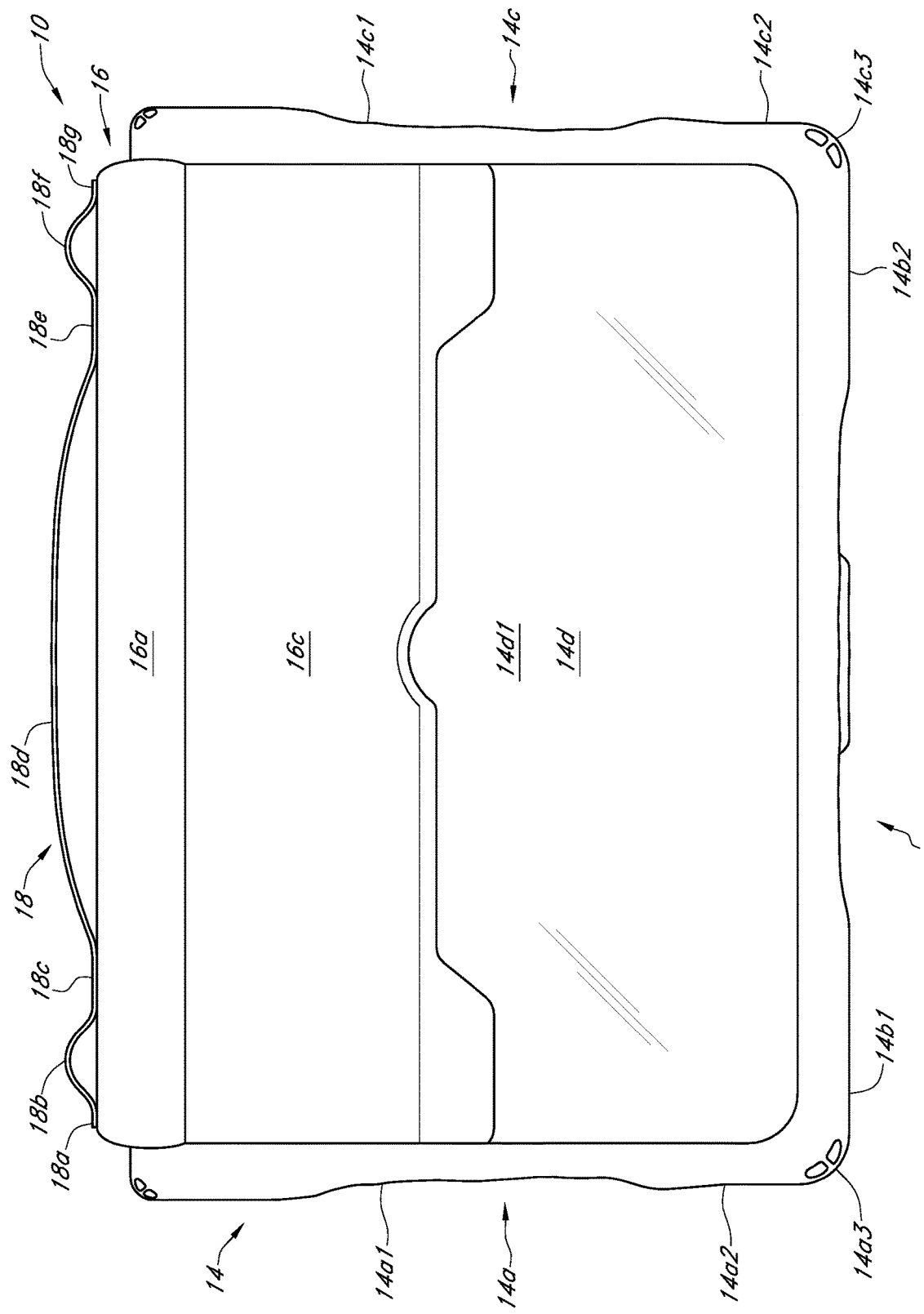
FIG. 4 is a front side-elevational view of device case assembly of FIG. 1 in closed configuration.

Turning to FIG. 4, depicted therein is a front side-elevational view of device case assembly of FIG. 1 in closed configuration.

Figure 5:
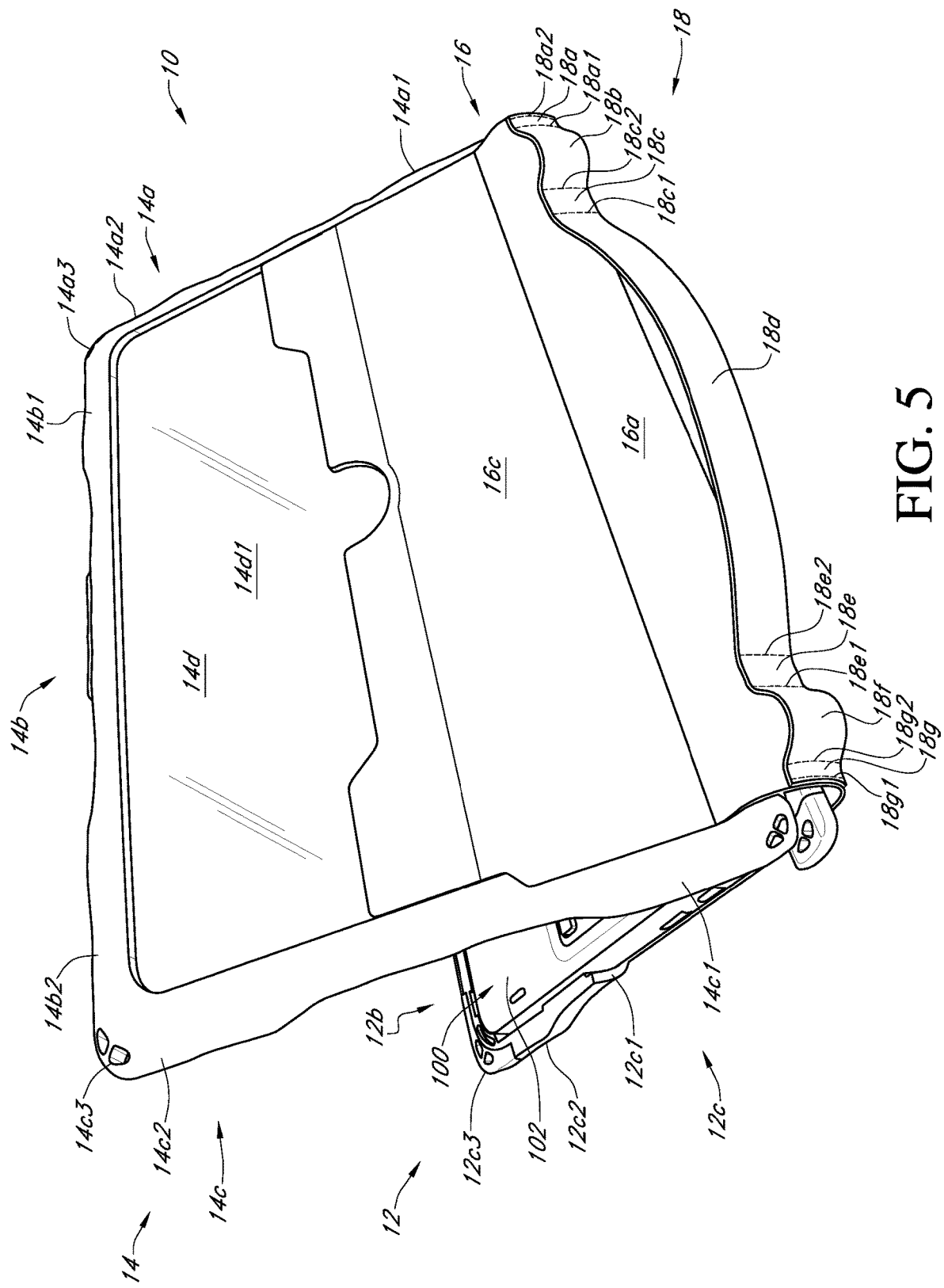
FIG. 5 is a rear perspective view of a device case assembly in partial open configuration.

Turning to FIG. 5, depicted therein is a rear perspective view of a device case assembly in partial open configuration shown containing electronic device 100 with keyboard portion 102.

Figure 6:
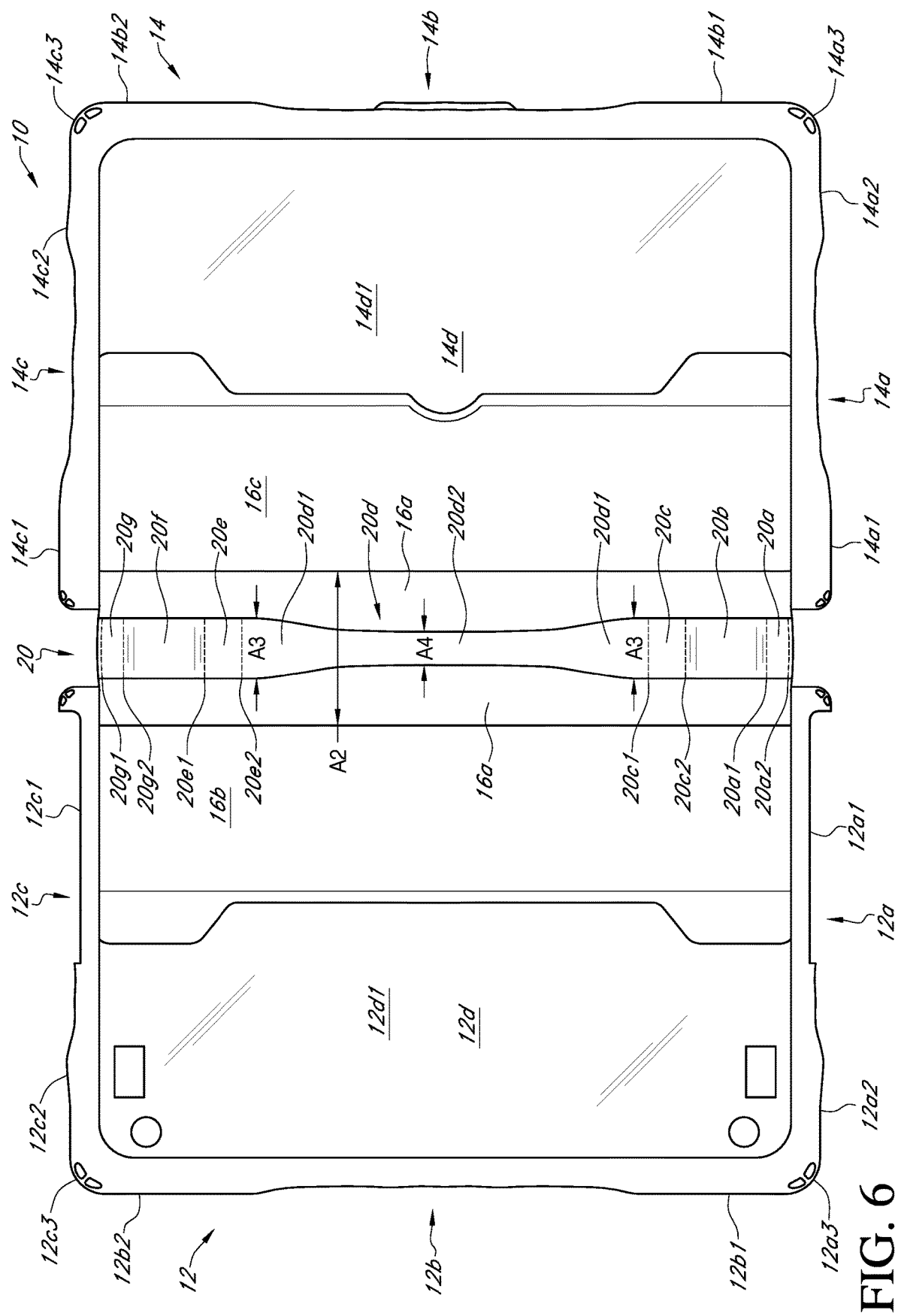
FIG. 6 is a posterior plan view of device case assembly in flat-open configuration including spine member, first case section, and second case section for portable electronic computing device with spine member coupled to first case section and second case member with second handle assembly coupled to spine member.

FIG. 6 is a posterior plan view of device case assembly in flat-open configuration including spine member, first case section, and second case section for portable electronic computing device with spine member coupled to first case section and second case member with second handle assembly coupled to spine member.

In implementations, device case assembly 10 is shown to include handle assembly 20. The handle assembly 20 is shown to include contact portion 20a, loop 20b, contact portion 20c, handle 20d, contact portion 20e, loop 20f, and contact portion 20g. The contact portion 20a is shown to be coupled to spine portion 16a of spine member 16 by stitching 20a1 and stitching 20a2. The contact portion 20c is shown to be coupled to spine portion 16a of spine member 16 by stitching 20c1 and stitching 20c2. The contact portion 20e is shown to be coupled to spine portion 16a of spine member 16 by stitching 20e1 and stitching 20e2. The contact portion 20g is shown to be coupled to spine portion 16a of spine member 16 by stitching 20g1 and stitching 20g2. In implementations, device case assembly 10 is shown to include linear dimension A4 (e.g., narrower width) located on middle of handle 18d, the linear dimension A4 being smaller than linear dimension A3 (e.g., wider width) located on ends of handle 18d.

Figure 7:
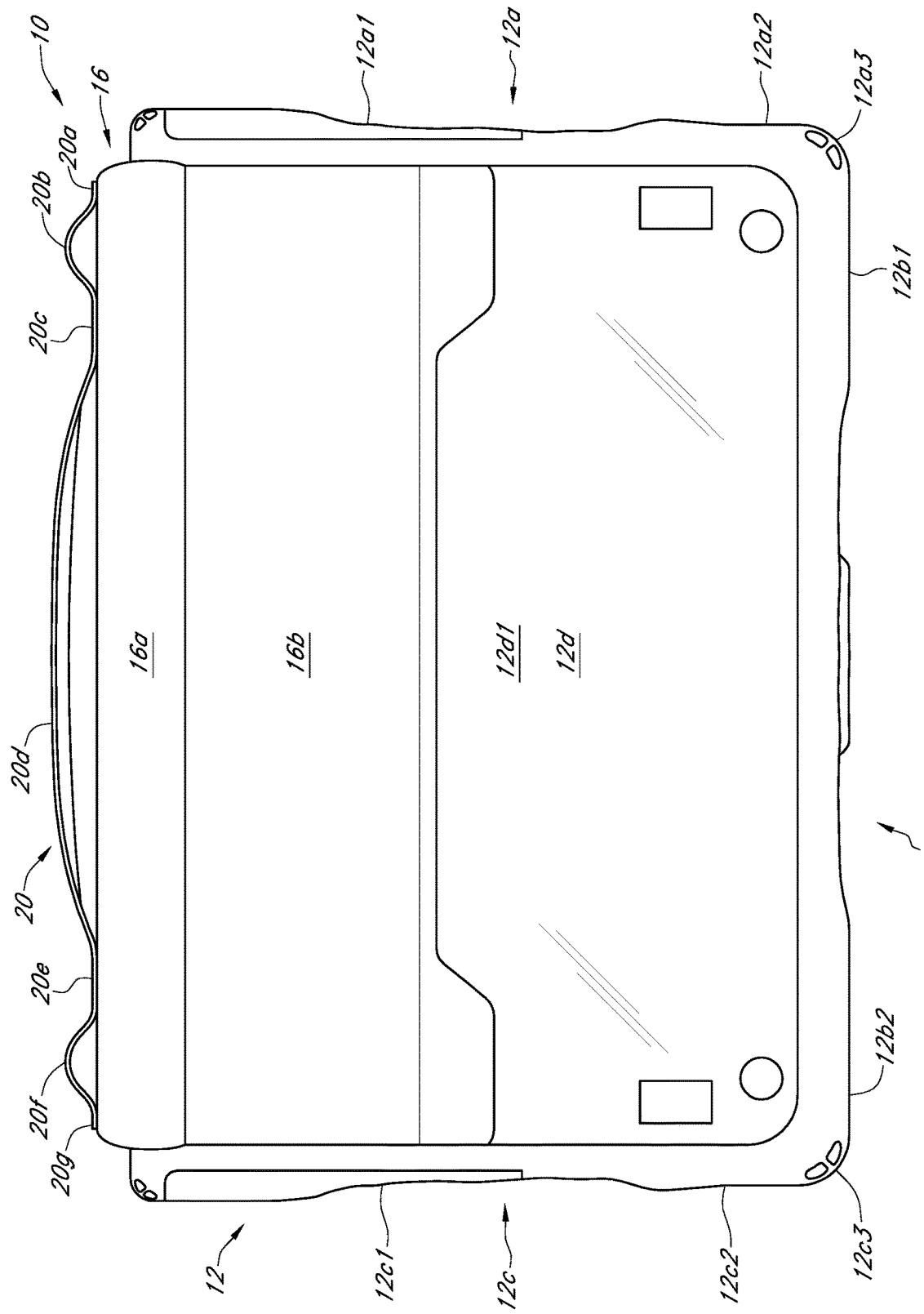
FIG. 7 is a rear side-elevational view of device case assembly of FIG. 6 in closed configuration.

Turning to FIG. 7, depicted therein is a rear side-elevational view of device case assembly of FIG. 6 in closed configuration.

Figure 8:
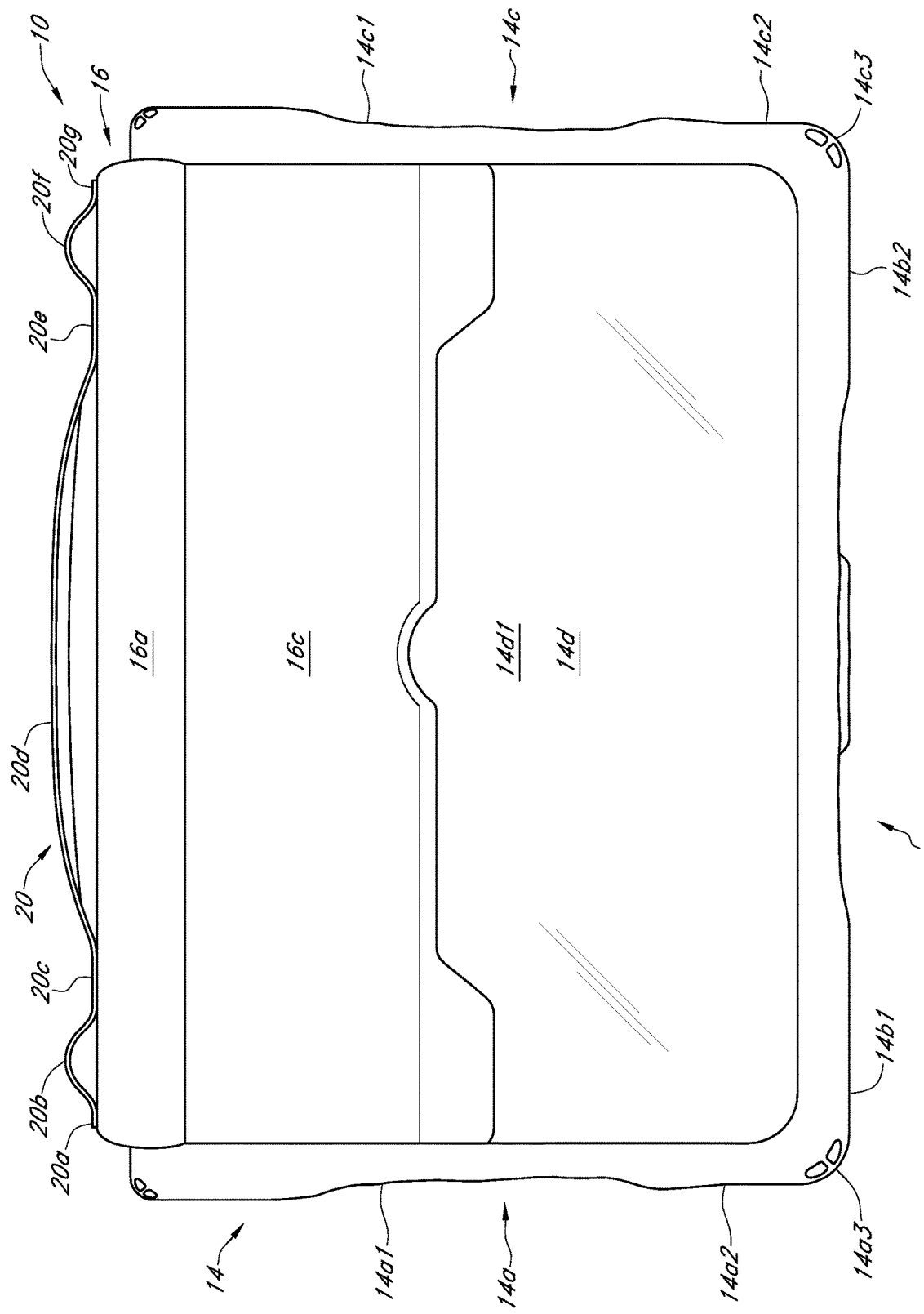
FIG. 8 is a front side-elevational view of device case assembly of FIG. 6 in closed configuration.

Turning to FIG. 8, depicted therein is a front side-elevational view of device case assembly of FIG. 6 in closed configuration.

Figure 9:
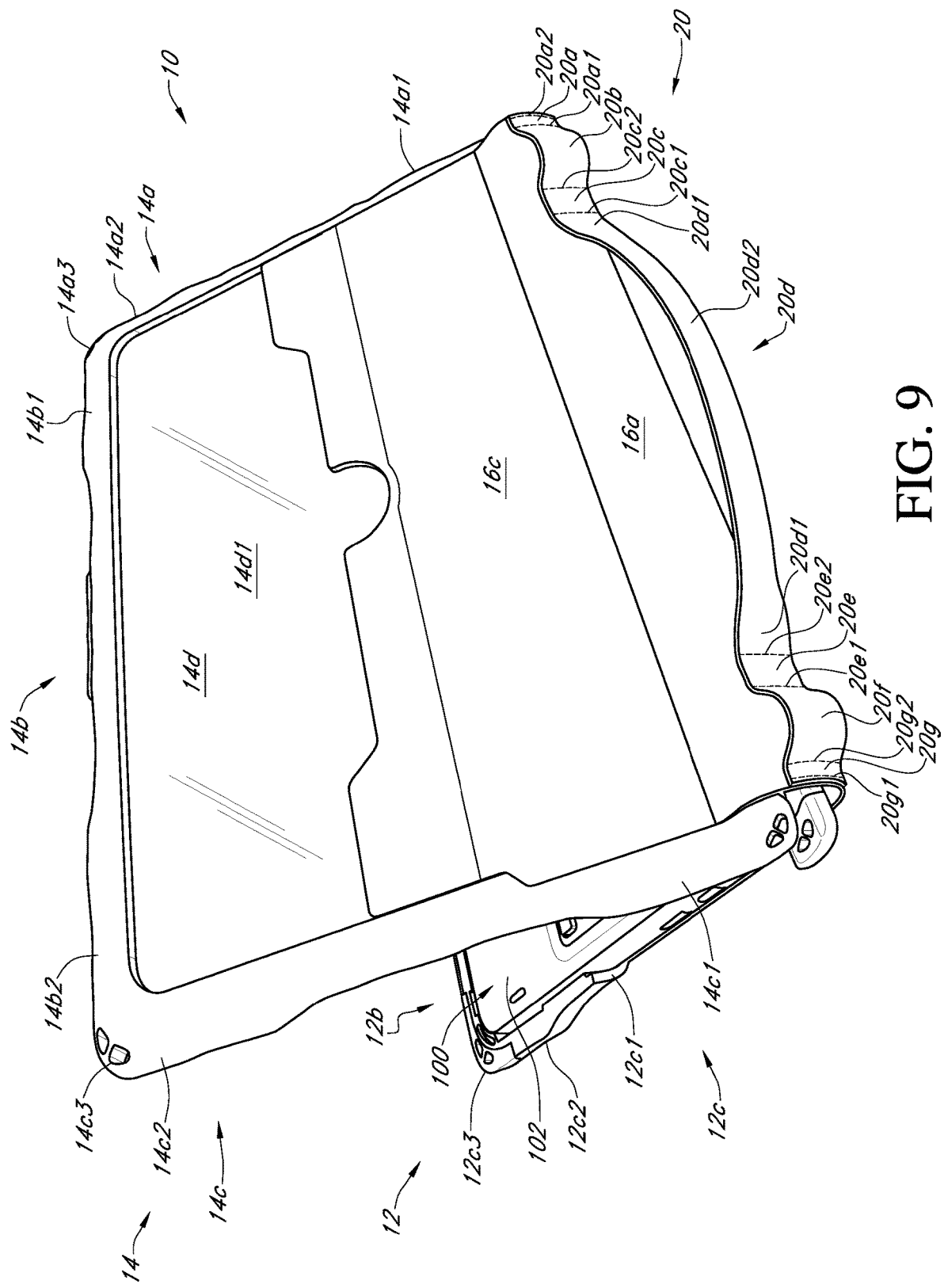
FIG. 9 is a rear perspective view of device case assembly of FIG. 6 in partial open configuration.

Turning to FIG. 9, depicted therein is a rear perspective view of device case assembly of FIG. 6 in partial open configuration.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A system for a portable electronic computing device, the portable electronic computing device including a first device portion, and a second device portion, wherein the first device portion being at least one of the following: being hingedly couplable with the second device portion and being separately uncouplable from the second device portion, the system comprising:
   (I) a first case section including
      (A) a base including at least one interior surface,
      (B) a first side including at least one first wall portion with the at least one first wall portion extending perpendicularly to the at least one interior surface,
      (C) a second side including at least one second wall portion with the at least one second wall portion extending perpendicularly to the at least one interior surface, and
      (D) a third side including at least one third wall portion with the at least one third wall portion extending perpendicularly to the at least one interior surface,
      wherein the at least one first wall portion extends perpendicularly to the second wall portion, and
      wherein the at least one first wall portion extends parallel with the at least one third wall portion such that
   the first case section being configured to receive the first device portion of the portable electronic computing device;
   (II) a second case section including
      (A) a base including at least one interior surface,
      (B) a first side including a at least one first wall portion with the at least one first wall portion extending perpendicularly to the at least one interior surface,
      (C) a second side including a at least one second wall portion with the at least one second wall portion extending perpendicularly to the at least one interior surface, and
      (D) a third side including a at least one third wall portion with the at least one third wall portion extending perpendicularly to the at least one interior surface,
      wherein the at least one first wall portion extends perpendicularly to the second wall portion, and
      wherein the at least one first wall portion extends parallel with the at least one third wall portion such that the second case section being configured to receive the second device portion of the portable electronic computing device;
   (III) a spine member being coupled to the first case section, the spine member being coupled to the second case section; and
   (IV) a flexible elongated member coupled to the spine member having a first coupling portion coupled to the spine member at a first spine location, the spine member having a second coupling portion coupled to the spine member at a second spine location, the flexible elongated member including a first length between the first coupling portion of the flexible elongated member and the second coupling portion of the flexible elongated member, the spine member including a first length between the first spine location and the second spine location, the first length of the flexible elongated member being greater than the first length of the spine member.

2. The system of claim 1 wherein the spine member includes at least one of the following materials: cloth, bendable metalized synthetic material, acrylonitrile butadiene styrene (ABS), low density polyethylene (LDPE) plastic, polyvinyl chloride, thermoplastic polyurethane (TPU), silicone, fabric, polyester, nylon leather, neoprene, thermoplastic rubber (TPR), and thermoplastic elastomers (TPE).

3. The system of claim 1 wherein the first case portion, the second case portion, and the spine member being of at least one co-molded material structure.

4. The system of claim 1 wherein the spine member being coupled to the first case section via being glued to the first case section and the spine member being coupled to the second case section via being glued to the second case section.

5. The system of claim 1 wherein the first case section being of at least one first material substance including at least one high-density polyethylene (HDPE) plastic, and wherein the second case section being of the at least one first material substance including the at least one high-density polyethylene (HDPE) plastic.

6. The system of claim 1 wherein the spine member being coupled through co-molding to the first case section and the second case section with a reinforced material including an elasticity greater than the first case section and the second case section.

7. The system of claim 1 wherein the flexible elongated member includes a mid-portion, the mid-portion positionable to be spaced from the spine member with a gap therebetween.

8. The system of claim 1 wherein the flexible elongated member being of a fabric material selected from at least one of polyester, nylon, leather, neoprene, polyurethane and polyvinyl chloride.

9. The system of claim 1 wherein the flexible elongated member being of a pliable molded material selected from at least one of silicone, thermoplastic polyurethane (TPU), and thermoplastic rubber (TPR).

10. The system of claim 1, wherein the flexible elongated member being coupled to the spine member via stitching, the stitching including at least one of polyester and nylon thread.

11. The system of claim 1, wherein the flexible elongated member being coupled to the spine member via at least one of the following: one or more rivets, one or more screws, and one or more pins.

12. The system of claim 1, wherein the flexible elongated member being coupled to the spine member via at least an adhesive material.

13. The system of claim 1, wherein the flexible elongated member being coupled to the spine member via at least one thermal bonding.

14. The system of claim 1, wherein the flexible elongated member being coupled to the spine member via lamination of the flexible elongated member with the spine member.

15. The system of claim 1 wherein the flexible elongated member includes a longitudinal dimension and a width dimension, the longitudinal dimension extending between the first coupling portion and the second coupling portion of the flexible elongated member, the width dimension being perpendicular to the longitudinal dimension, the width dimension being constant at positions taken along the longitudinal dimension.

16. The system of claim 1 wherein the flexible elongated member includes a mid-portion, a longitudinal dimension, and a width dimension, the longitudinal dimension extending between the first coupling portion and the second coupling portion of the flexible elongated member, the width dimension being perpendicular to the longitudinal dimension, the width dimension at the mid-portion of the flexible elongated member being smaller than the width dimension at other than the mid-portion of the flexible elongated member.

* * * * *